United States Patent [19]

Hunt

[11] 4,258,817
[45] Mar. 31, 1981

[54] METHOD OF INSTALLING, AND RETAINING, SKIRT SEGMENTS ON AN AIR CUSHION VEHICLE, AND MEANS THEREFORE

[76] Inventor: Rowland D. Hunt, 1043 75th Ave., SW., Calgary, Alberta, Canada

[21] Appl. No.: 926,838

[22] Filed: Jul. 21, 1978

[51] Int. Cl.$^3$ .............................................. B60V 1/16
[52] U.S. Cl. ................................................. 180/127
[58] Field of Search ............................... 180/127, 128

[56] References Cited

U.S. PATENT DOCUMENTS

| 3,362,499 | 1/1968 | Tripp | 180/128 X |
| 3,871,476 | 3/1975 | Crowley | 180/127 |
| 4,122,909 | 10/1978 | Fair | 180/127 |

FOREIGN PATENT DOCUMENTS 981730  1/1976  Canada .................................... 180/127

*Primary Examiner*—John P. Silverstrim
*Attorney, Agent, or Firm*—Sidney T. Jelly

[57] ABSTRACT

Skirt segments for a segmental skirt of an air cushion vehicle can be removed and replaced without getting under the vehicle hull, by providing a rod or tube at each top edge of a segment, the inner ends of the rods or tubes being inserted into sockets on the vehicle bottom surface. The outer edge of the skirt segment, and the outer ends of the rods or tubes, are held against the vehicle structure by a clamping member. A tool can be provided which attaches to the outer ends of the rods or tubes to assist in removing or replacing a segment, the tool removed before applying the clamping member.

7 Claims, 7 Drawing Figures

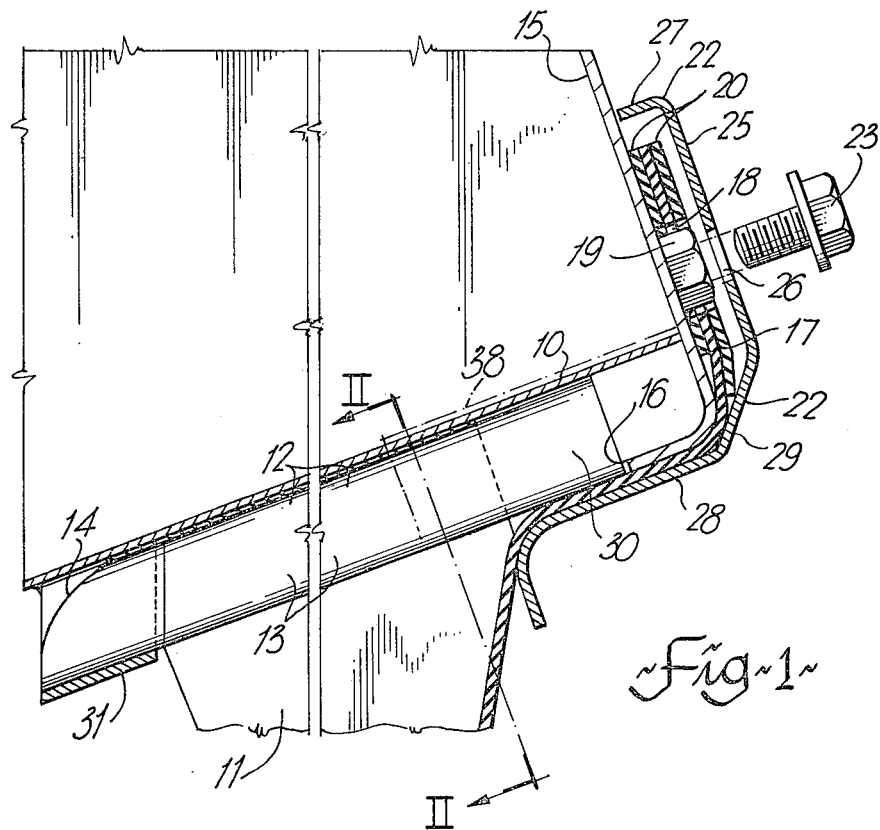
Fig-1
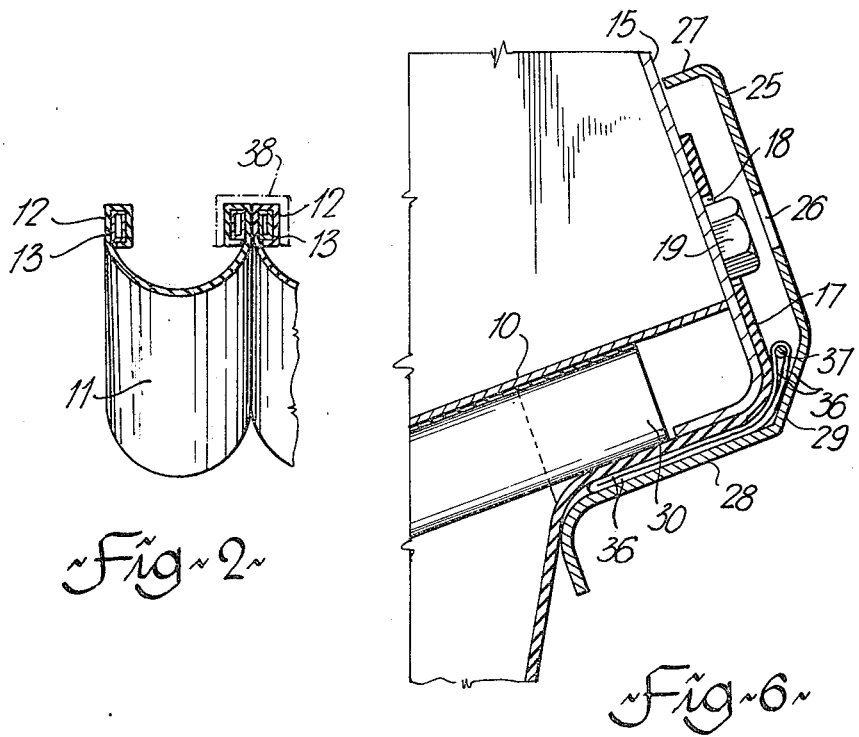
Fig-2
Fig-6

METHOD OF INSTALLING, AND RETAINING, SKIRT SEGMENTS ON AN AIR CUSHION VEHICLE, AND MEANS THEREFORE

This invention relates to a method of installing, and retaining, skirt segments on an air cushion vehicle, and to the means for such installation and retention.

In air cushion vehicles, the vehicle is supported on the surface, which may be land or water, or ice, by a cushion of low pressure air retained at least in part by a flexible skirt at the vehicle periphery. Such skirts are usually formed of individual segments, for example as described in Canadian Pat. No. 795,661, issued Oct. 1, 1968. While the individual segments are quite flexible and can part to allow passage of objects between segments, and can deflect to ride over obstructions, damage still occurs and also errosion. It is therefore necessary, from time-to-time, for segments to be replaced. This can be an extremely difficult job and usually requires that the vehicle be taken to a suitable work position and for the vehicle to be raised from the normal "off-cushion" position, that is with the hard portion of the hull which normally rests on the ground in "off-cushion" position being raised to provide access. Generally it is necessary for the person removing the damaged section, and installing a new section, to go under the vehicle.

The present invention permits removal, and replacement, of a segment while the vehicle is in an "off-cushion" position, without requiring anyone to go under the vehicle. Further, the segment removal and replacement can be carried out without a special work area, while the vehicle is on land or on water.

The skirt segment is attached at is upper edges to rods or tubes, the lower or inner ends of which are inserted in sockets. A tool which attaches to the outer end of each rod or tube assists in the initial locating of the lower or inner ends of the rods or tubes in the sockets. The outer ends of the rods or tubes are then brought up into contact with the hull of the vehicle and the tool removed. A flap may be attached to the skirt segment, and is brought up onto the vehicle periphery, a hole in the flap positioned over an attachment member, such as a nut attached to the vehicle periphery. A clamp plate is then attached to the hull by a bolt passing into the nut. The clamp plate clamps the flap against the hull, with the lower, inner end of the clamp plate positioned under the outer ends of the rods or tubes. To assist in retention of the flap against the vehicle periphery, the edge of the flap can be thickened, or a further flap having a roped edge, or similar, can be provided.

The invention will be readily understood by the following description of an embodiment, by way of example, in conjunction with the accompanying drawings, in which:

FIG. 1 is a cross-section through the lower part of the periphery of a vehicle, illustrating the attachment means;

FIG. 2 is a cross-section on the line II—II of FIG. 1, to a reduced scale;

FIG. 6 is a cross-section, similar to that of FIG. 1, illustrating an alternative embodiment;

Figure 3:
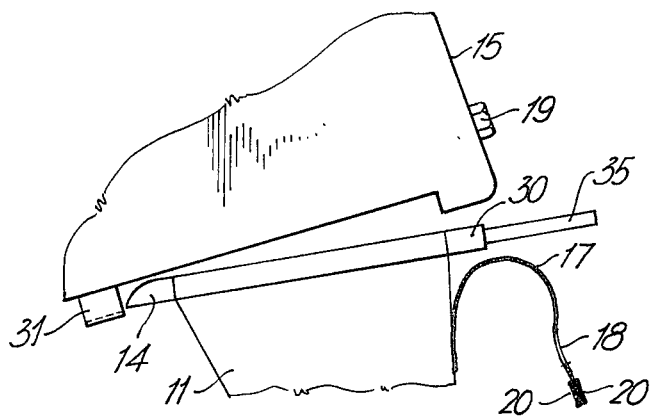
FIGS. 3, 4 and 5 illustrate various stages in the installation of a skirt segment.

FIG. 1 illustrates, somewhat diagrammatically, how a segment of a skirt is attached at its outer or peripheral edge, and also at the inner edge, to the vehicle structure. The hull bottom surface 10 is inclined upwardly and outwardly at the periphery enabling the vehicle to settle down on a hard surface and rest on a substantially flat central portion of the hull bottom and provide space for the flexible skirt to collapse freely and not bear any of the weight of the vehicle when in the "off-cushion" condition. This avoids damage to the skirt. However, although the skirt is "free" in that it is not trapped between the ground and the hull in such a condition, it is usually extemely difficult to replace a segment of a skirt. Generally the skirt is formed by a series of contiguous segments, such as are described in Canadian Pat. No. 795,661. Such skirts are formed so that stresses in the material, under normal operating conditions, are tensile and thus enable light weight flexible material to be used. The segments deflect readily and can part to permit obstacles to pass between segments. To replace one or more segments it is usually necessary to support the vehicle off the surface to enable personnel to get under the hull to undo the attachments. While this access can be provided at a suitably equipped repair and maintenances base, it is not readily provided when away from such a base.

In the present invention, as illustrated in FIGS. 1 and 2, a skirt segment 11 is attached at its top edges 12 of two tubular members 13. The inner end of the tubular members are pointed as seen at 14. The tubular members fit up against the hull bottom or deadrise 10, the outer ends 30 of the tubular members butting against the bottom of the hull side 15, at 16. The outer surface 17 of the skirt 11 is carried up and round the outside of the hull side, a hole 18 in the skirt fitting over a nut 19 welded to the hull side.

The top edge of the skirt is thickened by, for example, bonding on a layer of rubber, or similar material on each side, as indicated at 20. These layers 20 preferably extend down beyond the nut 19, the hole 18 also extending through the layers.

A metal clamp plate 22 is attached to the hull structure by means of a bolt 23 which screws into the nut 19. The clamp plate 22 has a flat main portion 25 in which is provided a hole 26 through which passes the bolt 23 to the nut 19. At its top edge 27 the clamp plate is bent inwards to abut the hull side 15. The lower part of the clamp is bent inwards, at 28, with a transition section 29 which rests against the bottom edge of the hull side. This clamps the outer surface 17, and the lower edges of the layers 20 forming the thickened edge, against the hull. The inwardly extending lower part 28 of the clamp plate holds the skirt outer surface 17 up against the periphery of the hull and also holds the outer ends 30 of the tubular members 13 up against the hull bottom 10, with the inner ends of the tubular members situated in sockets 31 attached to the hull bottom.

Thus each skirt segment is attached by means of the two tubular members 13 which are held in position by sockets 31 at the inner ends and by the clamp plate 22 at the outer ends.

Figure 4:
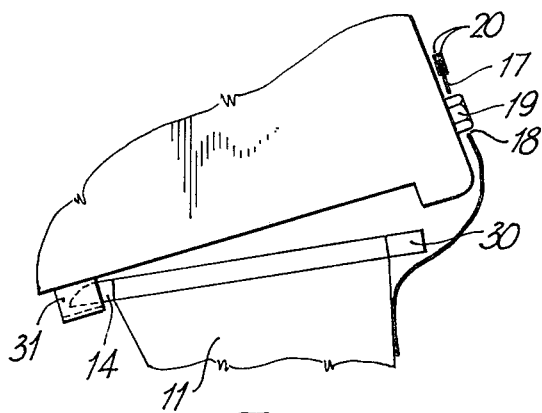
Figure 5:
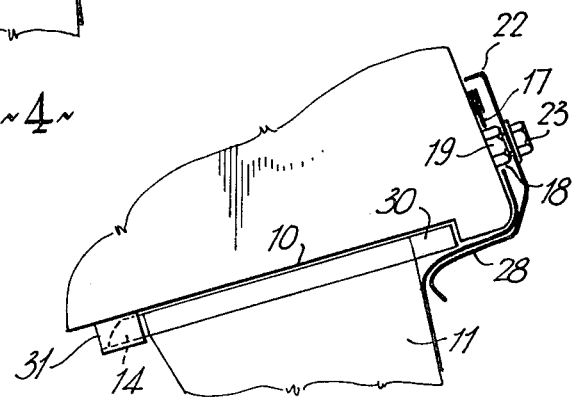

FIGS. 3 and 4 and 5 illustrate rather diagrammatically the installation of a skirt segment. The segment is initially held by inserting a holding tool 35 into the tubular members 13. The form of tool can vary but essentially comprises a form of handle with two parallel prongs or legs for insertion in the outer ends of the tubular members 13. The skirt segment is offered up to the hull base 10 at an angle, the pointed ends 14 assisting in guiding the inner ends of the tubular members into the sockets 31. This is the position as illustrated in FIG. 3.

As the tubular members are pushed into the sockets, they are rotated upwards, and when fully inserted in the sockets will be supported by them. The tool 35 is then removed. The outer surface 17 of the skirt 11 is then brought up and pressed over the nut 19. The situation is then as illustrated in FIG. 4.

Finally the clamp plate 22 is attached. The plate is first pushed in under the outer ends 30 of the tubular member 13 and then lifted up, raising the outer ends 30 into position against the hull bottom 10 and pressing up the outer surface 17 of the skirt. The bolt 23 is inserted through the hole 26 and tightened, clamping the skirt outer surface 17 against the periphery of the hull. This provides a substantially air tight seal against leakage of air from the cushion space.

A clamp plate 22 can be provided for each skirt segment. Each such clamp plate can be associated with a single segment, or alternatively it can be arranged that a clamp plate extends over half of one segment and half of the adjacent segment. Further, particularly on straighter portions of a vehicle hull, a clamp plate can serve to attach more than one segment. Where a clamp plate extends over two adjacent segments, with half the plate over one segment and half over the adjacent segment, two holes 26 can be provided, with two holes 18 in each segment and two nuts 19. With this arrangement, a clamp plate will be attached to a nut extending through one segment and to another nut extending through the other segment. Alternatively the nuts 19 can be attached to the hull side at the joint position between two adjacent segments.

The removal of a segment is by the reverse of the above description with respect to FIGS. 3, 4 and 5. The clamp plate 22 is removed, the skirt outer surface 17 pulled off and down, the tool 35 inserted in the tubular members 13, and the segment removed. The removal and installation can be done from outside the periphery of the vehicle while it is resting on the ground, in "off-cushion" condition, or even while floating on water in the same condition. On ice, of course, the situation is the same as on ground. No access is required to the underside of the vehicle and it is possible for a vehicle operator to replace segments during a voyage, without special equipment except for the tool 35. The sockets 31 are open ended to avoid clogging.

FIG. 6 illustrates a modification of the arrangement of FIG. 1 in which instead of the top edge of the skirt outer surface 17 being thickened, as illustrated in FIG. 1, a further flap formed by a folded length of material, e.g., rubber sheet 36 is attached to the skirt and wrapped round a rope 37. When the clamp plate 22 is applied the rope, and its wrapping, is trapped between the clamp plate 22 and the vehicle.

Figure 7:
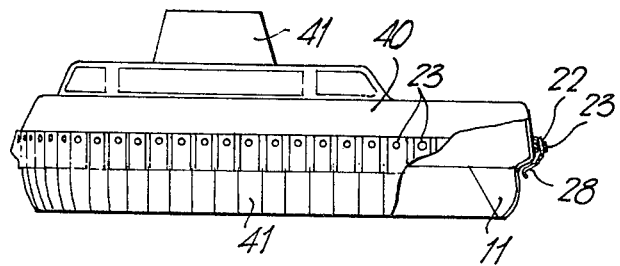
FIG. 7 is a side view of one form of vehicle, embodying the invention, with part in section.

A typical vehicle is illustrated in FIG. 7, comprising a hull portion 40, superstructure 41, housing lift fan and other power sources, and having a peripherally extending segmental skirt 42. A rear portion is shown in section to illustrate the application of the present invention. The segmental skirt can extend for the entire periphery of the vehicle, or for only a part, or parts, of the periphery.

While the outer surface 17 of the skirt is shown as more or less vertical, it is possible for this angle to vary inclining inwards or outwards, or be arcuate.

To provide location and positioning of the outer ends 30 of the members 13, U-shaped members can be attached to the bottom of the vehicle. One such member is indicated in dotted outline in FIG. 2 at 38 and is similarly indicated in FIG. 1. The two members 30 at edges of adjacent skirt segments are positioned in one U-shaped member.

Other ways of attaching the clamp plate 22, instead of nuts 19 and bolts 23, can be provided. For example studs welded to the vehicle and nuts. To avoid difficulty in that threaded members may corrode and prove difficult to undo, wedge acting members and other devices can be used.

When easy access is available for changing, or installing, skirt segments, such as in a dock for servicing, it is not always necessary to use a tool for initially positioning the members 13 into the sockets 31.

Propulsion of the vehicle can vary, depending upon operational requirement. Thus air propellors, and engines, can be mounted on the superstructure 41. Air can be expelled from controllable ports in the side and ends of the superstructure, or the vehicle can be towed or pushed or otherwise moved. By a vehicle is meant any form of load carrying device supported over a surface. The air cushion may be found under the whole, or part of the vehicle body.

What is claimed is:

1. An air cushion vehicle having a body portion including a bottom surface and a peripheral surface extending upward from the bottom surface, and means extending for at least part of the peripheral surface for containing a cushion of pressurized gas beneath the vehicle, and socket members on said bottom surface and positioned inwardly from said peripheral surface, said means for containing a cushion of pressurized gas including a flexible skirt comprising a plurality of flexible skirt segments, each segment having two substantially parallel sides and an outer periphery, a rigid elongate member at the top edge of each of said sides and each elongate member having inner and outer ends, each of said inner ends situated on one of said socket members on the bottom surface of the vehicle, and a plurality of clamping members, said clamping members engaging said outer ends of the elongate members and extending over said peripheral surface of the vehicle body to clamp the outer peripheries of the skirt segments against the vehicle body.

2. A method of attaching a flexible skirt segment to the periphery of the hull of an air cushion vehicle, the vehicle hull having a bottom surface and a peripheral surface extending upward from the bottom surface, the segment having two substantially parallel sides, comprising:

attaching a rigid elongate member to the top edge of each side of said skirt segment, the elongate members each having an inner end and an outer end;

attaching a holding tool to the outer ends of the elongate members;

positioning the skirt segments beneath the vehicle and aligning the inner edges of the elongate members with sockets on the hull;

lifting the outer ends of the elongate members up into contact with the peripheral surface of the hull and inserting the inner ends of the elongate members into said sockets;

removing the holding tool;

fitting a clamping member on the periphery of the vehicle, the clamping member extending over the outer periphery of the skirt segment and holding said outer ends of said elongate members against the peripheral surface of the vehicle.

3. The method of claims 2, said skirt segment including a flap at its outer surface, including lifting said flap up over the outer periphery of the vehicle after removal of said holding member, fitting of said clamping member clamping said flap against the vehicle periphery.

4. The method of claim 3, the vehicle having a plurality of attachment members on the outer periphery thereof, including positioning said flap over at least one of said attachment members on lifting said flap up over the outer periphery of the vehicle, an aperture in the flap fitting over an attachment member, and fitting said clamping member to said attachment member.

5. The method as claimed in claim 4, said attachment members comprising threaded members, including attaching said clamping members by further members engaging with said threaded members.

6. A flexible skirt for an air cushion vehicle having a hull including a bottom surface and a peripheral surface extending upward from said bottom surface, comprising:
 a plurality of flexible skirt segments, each segment having two substantially parallel sides and an outer periphery and including a flap at said outer periphery for positioning over the periphery of the vehicle;
 a rigid elongate member at the top edge of each of said sides, each elongate member having inner and outer ends;
 each of said inner ends of said elongate members adapted to fit in a related socket on the vehicle hull;
 a plurality of clamping members for attachment to the vehicle periphery, each of said clamping members being shaped to engage said outer ends of said elongate members where said elongate members are positioned against said peripheral surface, each of said clamping members being further shaped to extend over the periphery of the vehicle to retain said flaps against the vehicle periphery.

7. A method of attaching a flexible skirt segment to the periphery of an air cushion vehicle, the vehicle having a bottom surface an a peripheral surface extending upward from the bottom surface, the segment having two substantially parallel sides and an outer periphery and including a flap at said outer periphery, and a rigid elongate member at the top edge of each side, comprising:
 positioning the skirt segment beneath the vehicle periphery, an inner end of each elongate member engaging with a holding member on the vehicle bottom surface positioned inwardly from the peripheral surface of the vehicle;
 positioning said flap up over the peripheral surface of the vehicle;
 attaching a clamping member to the vehicle periphery, the clamping member extending under said bottom surface and holding an outer end of each elongate member up against said bottom surface, said clamping member also extending up said peripheral surface and holding said flap against said peripheral surface.

* * * * *